(12) United States Patent
Chen

(10) Patent No.: US 7,670,571 B2
(45) Date of Patent: Mar. 2, 2010

(54) APPARATUS FOR PHOTOCATALYTIC REACTION

(75) Inventor: Ga-Lane Chen, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1081 days.

(21) Appl. No.: 11/306,959

(22) Filed: Jan. 17, 2006

(65) Prior Publication Data

US 2006/0222575 A1    Oct. 5, 2006

(30) Foreign Application Priority Data

Mar. 31, 2005   (CN)   ................. 2005 1 0033945

(51) Int. Cl.
*B01J 19/08* (2006.01)
(52) U.S. Cl. .................................. 422/186.3
(58) Field of Classification Search ............. 422/186.3
See application file for complete search history.

(56) References Cited

U.S. PATENT DOCUMENTS 3,914,787 A * 10/1975 Sekiguchi ................... 348/339
4,957,371 A * 9/1990 Pellicori et al. ............. 356/419
6,024,929 A * 2/2000 Ichikawa et al. ............ 422/186
6,833,089 B1   12/2004 Kawahara et al.

* cited by examiner

*Primary Examiner*—Kishor Mayekar
(74) *Attorney, Agent, or Firm*—Winston Hsu

(57) ABSTRACT

An exemplary apparatus for photocatalytic reaction includes a light-permeable substrate, a photocatalytic layer, and one or more converging lenses. The light-permeable substrate includes a first surface and an opposite second surface. The photocatalytic layer is formed on the first surface of the substrate. The lenses are movably formed on the second surface of the substrate and are configured for converging light onto the photocatalytic layer. The apparatus further includes one or more optical filters. The optical filters each include at least one layer assembly. The layer assembly is formed on one of a topside and an underside of the respective lens. Alternatively, the layer assembly can be formed on one of the first and second surfaces of the substrate. The optical filters are configured for allowing light of at least one predetermined band to pass therethrough.

13 Claims, 4 Drawing Sheets

APPARATUS FOR PHOTOCATALYTIC REACTION

CROSS-REFERENCES TO RELATED APPLICATION

This application is related to a recent U.S. patent application No. 11/307,589 now U.S. Pat. No. 7,450,306, entitled "OPTICAL FILTER FOR BLOCKING UV LIGHT AND IR LIGHT" which has the same assignee as the present application. The disclosure of the above-identified application is incorporated herein by reference.

FIELD OF THE INVENTION

The present invention relates to photocatalytic techniques and, particularly, to an apparatus for photocatalytic reaction.

DESCRIPTION OF RELATED ART

In recent years, more and more attention have been paid to depollution of environment, medical and health with the improvement of living standard. Attempts are being made to exploit various products for insuring the depollution of environment, medical and health. In particular, photocatalytic materials (also referred to as photocatalyst materials) have been practically used in various applications such as antibacteria, deodorization, antifouling, etc.

For instance, titanium dioxide ($TiO_2$) is a typical type of the photocatalytic material. When irradiated by ultraviolet light having a wavelength less than or equal to 380 nanometers, particles of titanium oxide react with adjacent molecules of water and oxygen. A plurality of hydrogen ions ($H^+$), hydroxyl ions ($OH^-$), and free radicals having strong reductive and oxidative capabilities (such as $O^-$, $O^{2-}$, and $O^{3-}$) are produced by such reaction. Thus, contaminants on a surface can be decomposed by the free radicals and then removed. In addition, large water droplets can not easily form on the surface, due to the presence of hydrogen ions ($H^+$) and hydroxyl ions ($OH^-$) thereon. A contact angle between any water droplet and the surface is reduced to a value close to zero, which is significantly less than a corresponding contact angle in the case where no photocatalyst materials are used. That is, the surface is rendered super hydrophilic after irradiation by ultraviolet light.

In the process of the photocatalytic reaction, the intensity of the light is an important factor in affecting the redox activity of the photocatalyst material. Further, the higher the intensity of light is, the faster the redox reaction proceeds. However, conventional apparatuses generally cannot provide satisfactory irradiation of the light, thereby decreasing the redox activity of the photocatalyst material.

What is needed, therefore, is an apparatus for photocatalytic reaction that is capable of providing a high intensity of light irradiation, thereby enhancing the redox activity of a photocatalyst material.

SUMMARY OF INVENTION

An apparatus for photocatalytic reaction includes a light-permeable substrate, a photocatalytic layer, and one or more converging lenses. The light-permeable substrate includes a first surface and an opposite second surface. The photocatalytic layer is formed on the first surface of the substrate. The lenses are formed on the second surface of the substrate and are configured for converging light onto the photocatalytic layer.

The apparatus further includes one or more optical filters. The optical filters each include at least one layer assembly each formed on the respective lens. The optical filters are configured for allowing light of predetermined band to pass therethrough. The light of predetermined band includes at least one of ultra-violet band light and infrared band light.

The optical filter preferably includes a plurality of layer assemblies. Alternatively, the optical filter includes only one layer assembly formed on one of the first and second surfaces of the substrate.

The lenses are advantageously movable relative to the substrate and arranged in an array.

The photocatalytic layer has a thickness in the range from about 20 nanometers to about 1000 nanometers. The photocatalytic layer is comprised of at least one of a first photocatalyst and a second photocatalyst.

The first photocatalyst is comprised of a material selected from the group consisting of silver, gold, platinum, and any alloys thereof. The first photocatalyst has an average grain size in the range from about 1 nanometer to about 1000 nanometers.

The second photocatalyst is comprised of a material selected from the group consisting of titanium dioxide, zinc oxide, iron oxide, nickel oxide, cobalt oxide, and any mixtures thereof. The second photocatalyst has an average grain size in the range from about 5 nanometers to about 1000 nanometers.

Other advantages and novel features of the embodiments will become more apparent from the following detailed description when taken in conjunction with the accompanying drawings.

BRIEF DESCRIPTION OF DRAWINGS

Many aspects of the apparatus can be better understood with reference to the following drawings. The components in the drawings are not necessarily to scale, the emphasis instead being placed upon clearly illustrating the present apparatus. Moreover, in the drawings, like reference numerals designate corresponding parts throughout the several views.

DETAILED DESCRIPTION

Embodiments of the present invention will now be described in detail below and with reference to the drawings.

Figure 1:
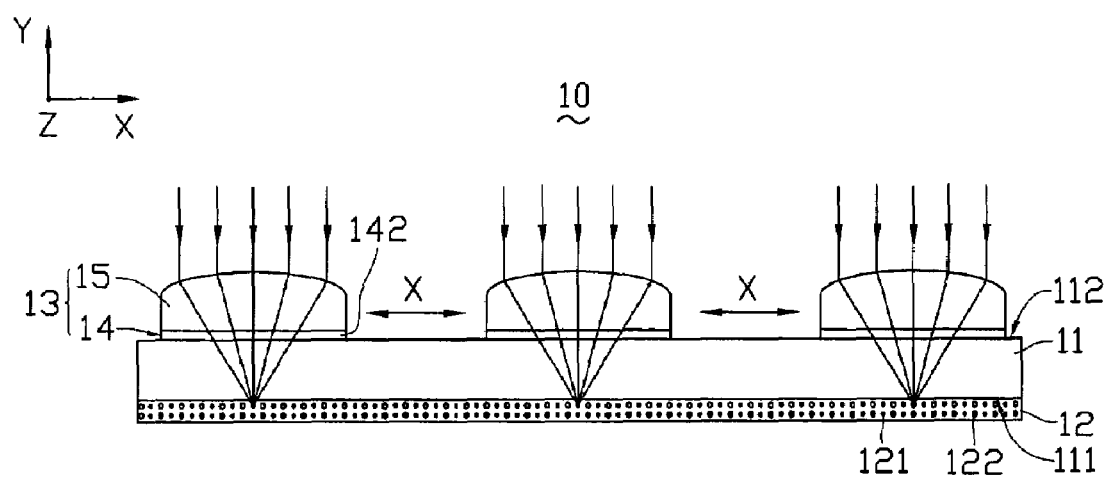
FIG. 1 is a schematic, side view of an apparatus for photocatalytic reaction in accordance with a preferred embodiment.

FIG. 1 illustrates an apparatus for photocatalytic reaction 10 in accordance with a preferred embodiment. The apparatus 10 mainly includes a light-permeable substrate 11, a photocatalytic layer 12, a plurality of optical filters 14, and a plurality of lenses 15.

The substrate 11 has a first surface 111 and an opposite second surface 112. The photocatalytic layer 12 is formed on a first surface 111 of the substrate 11. The lenses 15 are advantageously converging lenses. The lenses 15 are movably disposed on the second surface 112 of the substrate 11. The optical filters 14 each include at least one layer assembly 142. In the illustrated embodiment, the optical filters 14 each include a plurality of layer assemblies 142. The layer assemblies 142 are coated or deposited on undersides of the respective lenses 15. The lenses 15 and the optical filters 14 cooperatively form light converging assemblies 13. The light converging assemblies 13 are movable on the second surface 112 of the substrate 11.

The substrate 11 is advantageously made of a light-permeable material, for example, glass, silicon, polymethyl methacrylate (PMMA), polycarbonate (PC), or transparent glass-ceramic.

The photocatalytic layer 12 has a thickness in the range from about 20 nm to about 1000 nm. The thickness is beneficially in the range from about 50 nm to about 500 nm. The photocatalytic layer 12 is made of a plurality of first photocatalyst particles 121 and a plurality of second photocatalyst particles 122. The first and second photocatalyst particles 121, 122 are beneficially dispersed uniformly in the photocatalytic layer 12. The first and second photo-catalyst particles 121, 122 may be coated or deposited on the first surface 111 of the substrate 11 at the same time, for example, by a RF magnetron co-sputtering process.

Alternatively, the photocatalytic layer 12 could include a first photocatalyst film comprised of a plurality of first photocatalyst particles 121 and a second photocatalyst film comprised of a plurality of second photocatalyst particles 122. The first photocatalyst film is coated or deposited on the first surface 111 of the substrate 11, and then the second photocatalyst film is coated or deposited on the first photocatalyst film 11. Further, since the first and second photocatalyst particles 121, 122 have a given photocatalytic capability, the photocatalytic layer 12 could include only one of the first and the second photocatalyst films for attaining a desired effect. It is to be noted that although two photocatalyst films are exemplarily illustrated herein, more photocatalyst films could be optionally selected in the application of the present apparatus for photocatalytic reaction by those skilled in the art and be within the scope thereof.

The first photocatalyst particles 121 are advantageously comprised of a material, which has an excellent adsorption of infrared (IR) band light, for example, selected from the group consisting of gold (Au), silver (Ag), platinum (Pt), and any alloys thereof. The first photocatalyst particles 121 each have an average grain size in the range from about 1 nanometer to about 1000 nanometers. The average grain size is advantageously in the range from about 10 nanometers to about 100 nanometers.

The second photocatalyst particles 122 are advantageously comprised of a material, which has an excellent adsorption of ultraviolet (UV) band light, for example, selected from the group consisting of titanium dioxide ($TiO_2$), zinc oxide ($ZnO_x$), ferric oxide ($Fe_2O_3$), nickel oxide ($NiO_x$), cobalt oxide ($CoO_x$), and any mixtures thereof. The second photocatalyst particles 121 each have an average grain size in the range from about 5 nanometers to about 1000 nanometers. The average grain size is advantageously in the range from about 10 nanometers to about 200 nanometers.

Therefore, if the photocatalytic layer 12 includes one of the first and second films, the optical filters 14 can be relatively configured for transmitting one of IR light and UV light.

The optical filters 14 are configured for allowing light of a predetermined band to pass therethrough. Each of the layer assemblies 142 includes a plurality of three-layer unit cavities stacked one on another on an underside of the respective lens 15. Alternatively, the plurality of three-layer unit cavities could be stacked on a topside of the respective lens 15. Therefore, by moving the light converging assemblies 13, the light of the predetermined band, e.g., IR or UV band light, could be converged onto all over the entire photocatalytic layer 12.

The lenses 15 are preferably arranged in an array, for converging incident light onto the photocatalytic layer 12. The lenses 15 can move synchronously along three-dimensional directions, i.e., the X direction, the Y direction, and the Z direction, as shown in FIG. 1. For example, the lenses 15 could be fixed onto a movement configuration (not shown). The movement configuration includes a finely adjustable electric linear motor and a piezo-actuating element both engaged with the substrate 11. The X direction movement of the lenses 15 is controlled by the finely adjustable electric linear motor. The Y and Z direction movement of the lenses 15 are controlled by the piezo-actuating element. Accordingly, the light converging assemblies 13 can move on the second surface 112 of the substrate 12 along the three-dimensional directions.

Figure 2:
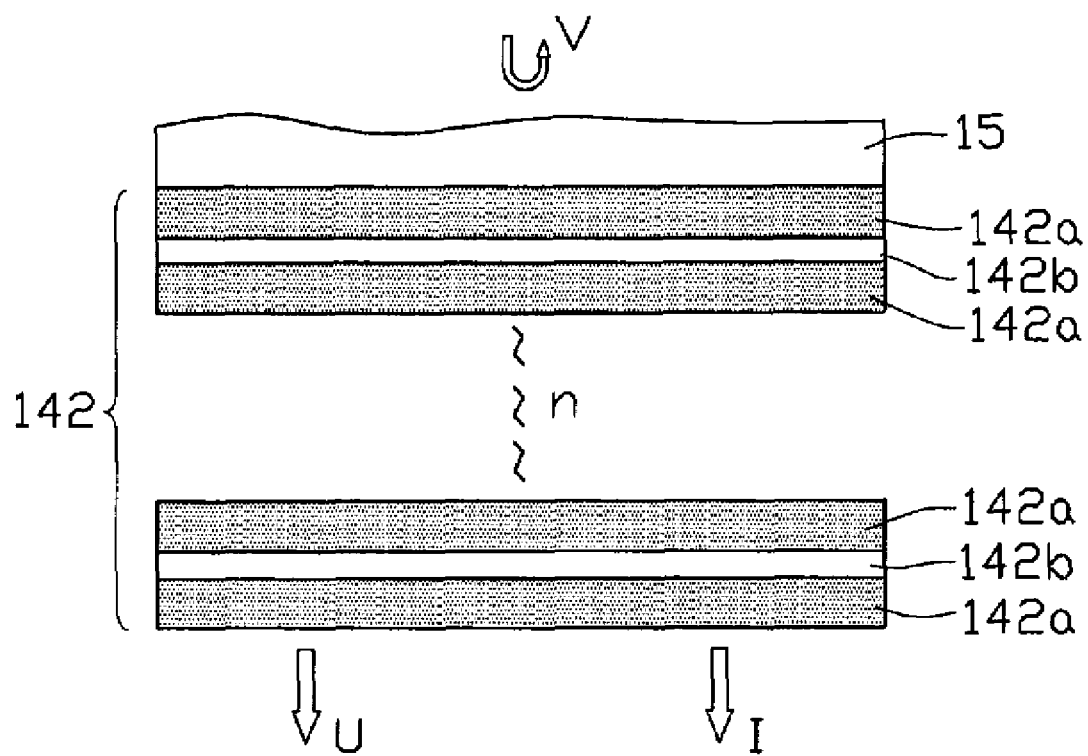
FIG. 2 is an enlarged view of an exemplary layer assembly of an optical filter of FIG. 1.

Referring to FIG. 2, an exemplary layer assembly 142 includes a plurality of three-layer unit cavities. Each three-layer unit cavity includes three optical thin films each having a quarter wavelength thickness. For example, each three-layer unit cavity includes two first optical thin films 142a each having a high refractive index and a second optical thin film 142b having a low refractive index. The second optical thin film 142b is sandwiched between the first optical thin films 142a. The three-layer unit cavities are stacked one on another thereby forming the layer assembly 142. The three-layer unit cavities are preferably arranged in the order of, 0.5 HL 0.5H (0.5 HL 0.5H)n 0.5 HL 0.5 H, wherein (0.5 HL 0.5H) represents a three-layer unit cavity, H represents the first optical thin film, 0.5 represents a thickness coefficient of the first optical thin film (H), L represents the second optical thin film, and n, which is an integer, represents the number of repetition of the unit cavity. The number n is generally in the range from 8 to 20. In the illustrated embodiment, n is 16.

The first optical thin films 142a are made of a material having a high refractive index in the range, e.g., from about 2.0 to about 2.3, such as titanium pentoxide ($Ti_3O_5$), titanium trioxide ($TiO_3$), titanium dioxide ($TiO_2$), tantalum pentoxide ($Ta_2O_5$), and so on. The second optical thin films 142b are made of a material having a low refractive index in the range, e.g., from about 1.4 to about 1.6, such as silicon dioxide ($SiO_2$), aluminum oxide ($Al_2O_3$), aluminum nitride (AlN), and so on.

Figure 3:
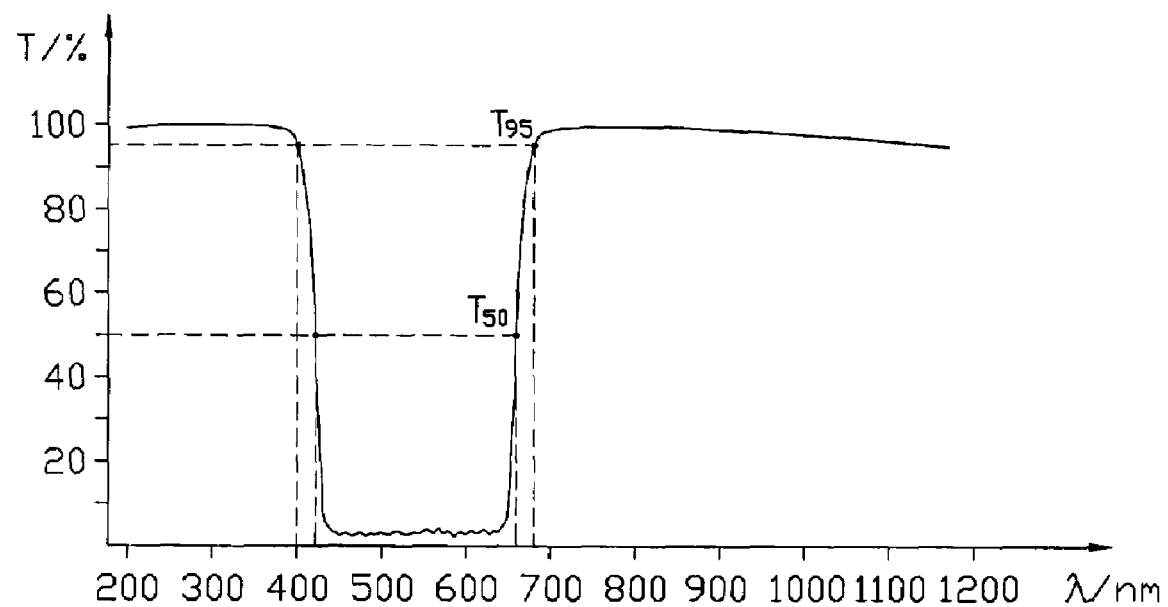
FIG. 3 is a graph showing a transmittance spectra of the optical filter of FIG. 2.

FIG. 3 illustrates the transmittance spectra of the optical filter 14. According to the adsorption need of the first and second photocatalyst particles 121 and 122, the optical filter 14 is configured as a dual band pass filter, i.e., for allowing transmission of UV band light, i.e., light wavelength below about 400 nm, and IR band light, i.e., light wavelength from about 700 to about 1100 nm. Further, a transmittance of the UV and IR band light of the optical filter 14 is generally higher than 90 percent, more advantageously higher than 95 percent. For the light of UV band, $T_{95}$, i.e., the transmittance (T) of IR light about 95 percent beneficially corresponds to a wavelength of 410±10 nm. For the sharp cutting slope, $T_{50}$ beneficially corresponds to a wavelength of 380±10 nm. Similarly, for the light of IR band, $T_{95}$ beneficially corresponds to a wavelength of 680±20 nm. For the sharp cutting slope, $T_{50}$ beneficially correspondes to a wavelength of 650±10 nm. As such, for the visible light, the transmittance thereof is usefully below 10 percent.

The operation principle is described as follows, using Ag and $TiO_2$ as examples for the first and second photocatalyst particles 121,122. Light is initially converged by the converging lenses 15. The light of UV and IR band is then allowed to pass through the optical filter 14. The converged light of UV and IR band is incident onto the photocatalytic layer 12, i.e., the Ag and TiO$_2$ photocatalyst particles. As such, light reaching the Ag and TiO$_2$ photocatalyst particles is the converged UV and IR light, i.e., having enhanced intensity associated therewith. Thus, the photocatalytic activity of the Ag and TiO$_2$ photocatalyst particles are enhanced thereby efficiently increasing the redox reaction speed. As a result, the photocatalytic layer 12 has improved efficiency of, e.g., anti-bacteria, deodorization, anti-toxicity, self-cleaning, non-fogging, non-soiling, influenza resistance, or contagiousness resistance.

Figure 4:
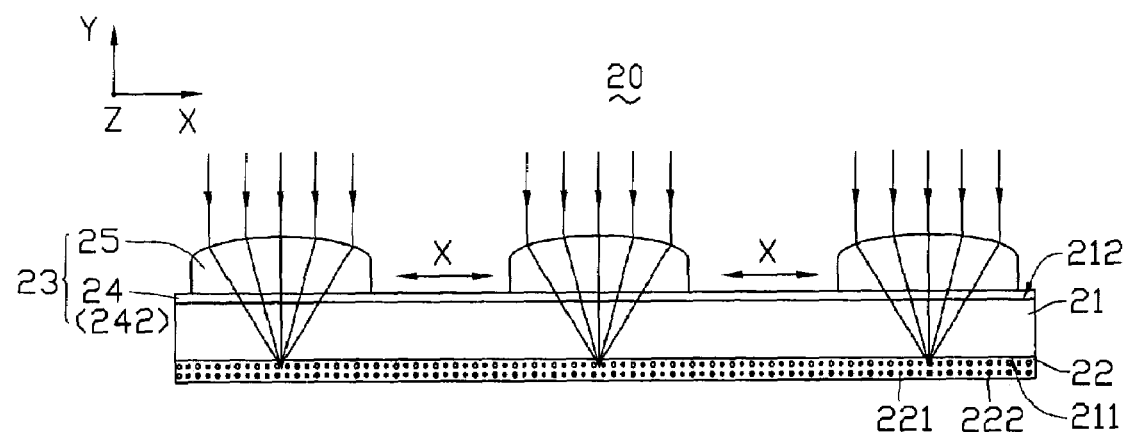
FIG. 4 is a schematic, side view of an apparatus for photocatalytic reaction in accordance with another preferred embodiment.

FIG. 4 shows an apparatus for photocatalytic reaction in accordance with another preferred embodiment. The apparatus 20 mainly includes a light-permeable substrate 21, a photocatalytic layer 22, an optical filter 24, and a plurality of lenses 25. The lenses 25 are movably arranged on the optical filter 24. The optical filter 24 and the lenses 25 cooperatively form a light converging assembly 23.

In the apparatus 20, the substrate 21, the photocatalytic layer 22, and the lenses 25 are essentially similar to the substrate 11, the photocatalytic layer 12, and the lenses 15 of the apparatus 10. The substrate 21 has a first surface 211 and an opposite second surface 212. The photocatalytic layer 22 is made of a plurality of first photocatalyst particles 221 and a plurality of second photocatalyst particles 222.

The optical filter 24 is essentially similar to one optical filter 14, except that the optical filter 24 includes only one layer assembly 242 formed on the second surface 212 of the substrate 21. In the illustrated embodiment, the optical filter 24 covers all over the entire second surface 212 and is coated or deposited thereon.

Alternatively, the optical filter 24 could be formed the first surface 211 of the substrate 21. In this case, the photocatalytic layer 22 should be sequentially formed on the optical filter 24, for facilitating filtering incident light prior to being transmitted onto the photocatalytic layer 22. The lenses 25 are movably arranged on the second surface 212 of the substrate 11.

The apparatus for photocatalytic reactions of the above-described preferred embodiments might be implemented into various products, which are benefit to environmental protection, medical and health of human. For example, the apparatus may be applied in daily domestic utensils, covers of electrical products, windowpanes of automobiles or buildings.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An apparatus for photocatalytic reaction comprising:
a light-permeable substrate comprising a first surface and an opposite second surface;
a photocatalytic layer formed on the first surface of the substrate; and
one or more converging lenses provided on the second surface of the substrate, the converging lenses being moveable relative to the substrate and being arranged in an array.

2. The apparatus for photocatalytic reaction of claim 1, further comprising one or more optical filters formed on the respective lenses, the optical filters being configured for allowing light of at least one predetermined band to pass therethrough.

3. The apparatus for photocatalytic reaction of claim 2, wherein the optical filters each comprise a plurality of layer assemblies.

4. The apparatus for photocatalytic reaction of claim 2, wherein the optical filters are formed on one of the first and second surfaces of the substrate.

5. The apparatus for photocatalytic reaction of claim 3, wherein the layer assemblies each comprise a plurality of three-layer unit cavities, the three-layer unit cavities each comprising two first optical thin films each having a high refractive index and a second optical thin film having a low refractive index, the second optical thin film being sandwiched between the first optical thin films.

6. The apparatus for photocatalytic reaction of claim 2, wherein the light of at least one predetermined band is in at least one band selected from the group consisting of an ultraviolet band and an infrared band.

7. The apparatus for photocatalytic reaction of claim 1, wherein the photocatalytic layer has a thickness in the range from about 20 nanometers to about 1000 nanometers.

8. The apparatus for photocatalytic reaction of claim 1, wherein the photocatalytic layer is comprised of at least one item selected from the group consisting of a first photocatalyst and a second photocatalyst.

9. The apparatus for photocatalytic reaction of claim 8, wherein the first photocatalyst is comprised of a material selected from the group consisting of silver, gold, platinum, and any alloys thereof.

10. The apparatus for photocatalytic reaction of claim 9, wherein the first photocatalyst has an average grain size in the range from about 1 nanometer to about 1000 nanometers.

11. The apparatus for photocatalytic reaction of claim 8, wherein the second photocatalyst is comprised of a material selected from the group consisting of titanium dioxide, zinc oxide, iron oxide, nickel oxide, cobalt oxide, and any mixtures thereof.

12. The apparatus for photocatalytic reaction of claim 11, wherein the second photocatalyst has an average grain size in the range from about 5 nanometers to about 1000 nanometers.

13. An apparatus for photocatalytic reaction, comprising:
a light-permeable substrate comprising a first surface and an opposite second surface;
a photocatalytic layer formed on the first surface of the substrate;
an optical filter disposed on one of the first and second surfaces of the substrate, the optical filter being configured for allowing light of predetermined band to pass therethrough; and
a plurality of converging lenses disposed on the substrate, the converging lenses being moveable relative to the substrate and being arranged in an array.

* * * * *